United States Patent Office 3,537,264
Patented Nov. 3, 1970

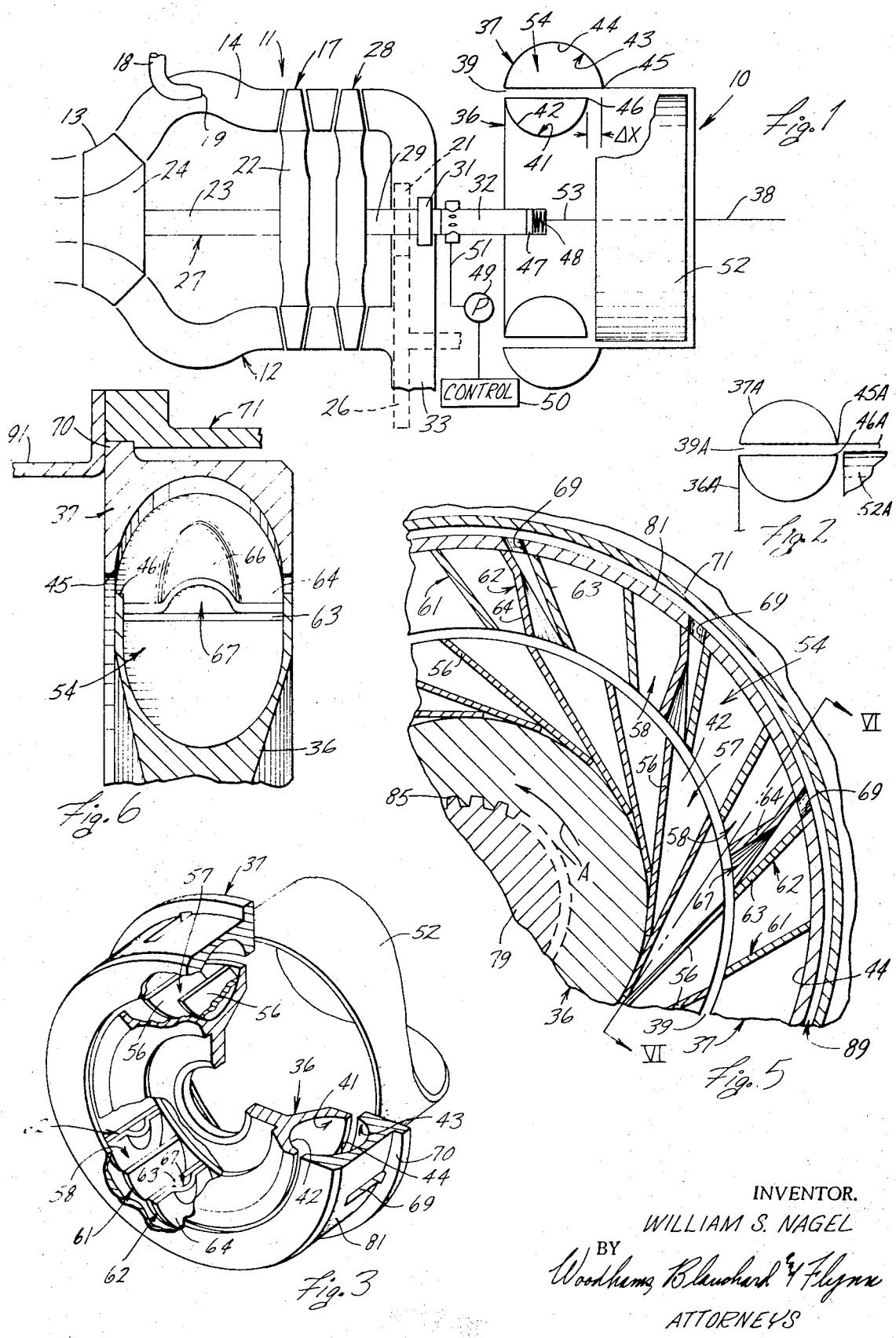

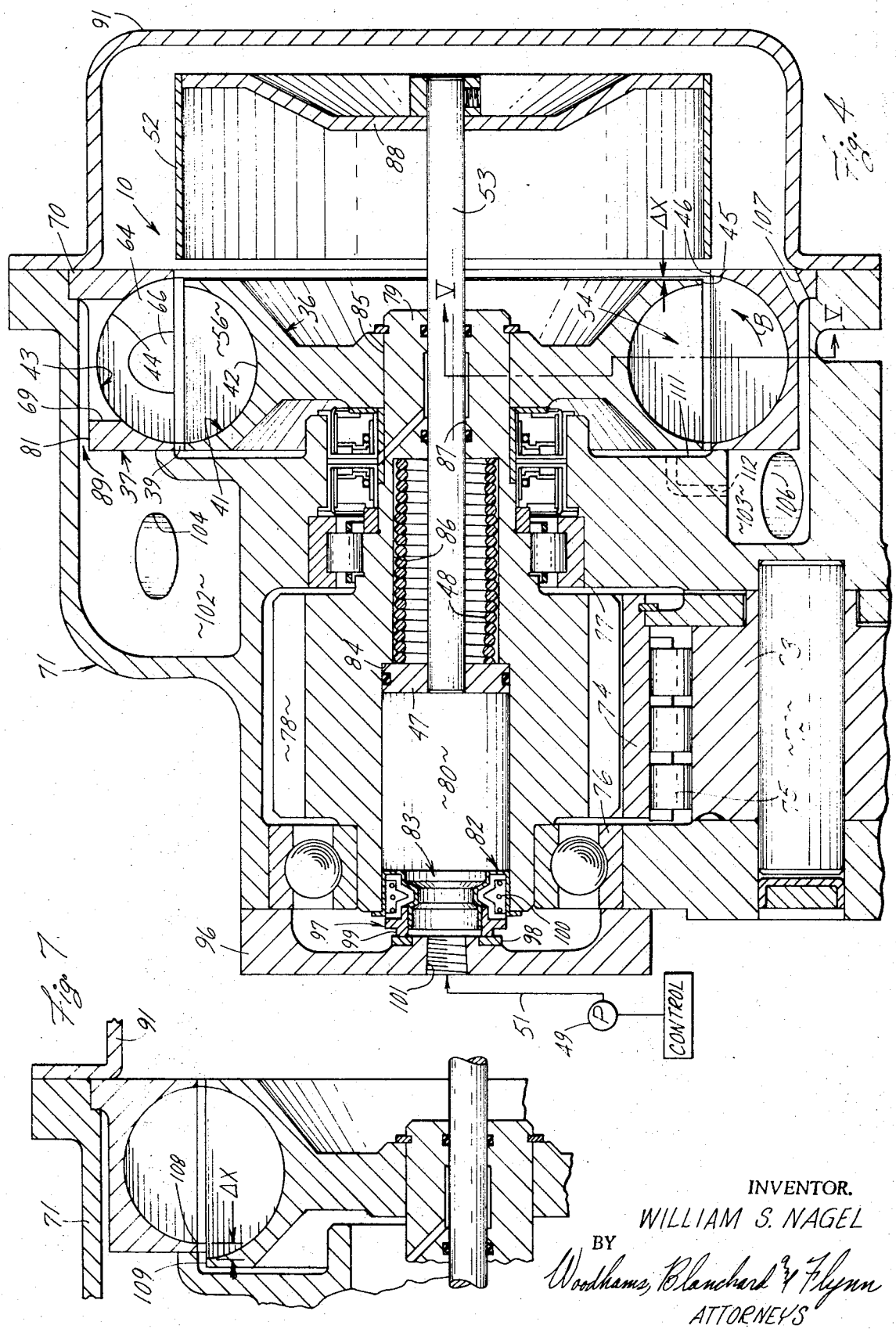

3,537,264
CENTRIFUGALLY BALANCED FLUID POWER TRANSMITTING OR ABSORBING DEVICE
William S. Nagel, Birmingham, Mich., assignor to Eaton Yale & Towne Inc., Cleveland, Ohio, a corporation of Ohio
Continuation-in-part of application Ser. No. 631,460, Apr. 17, 1967. This application Mar. 27, 1969, Ser. No. 811,185
Int. Cl. F16d *33/00, 57/00*
U.S. Cl. 60—54       9 Claims

ABSTRACT OF THE DISCLOSURE

A fluid torque transfer device for transferring torque from a first member to a second member radially spaced therefrom. The first member and the second member have radially positioned and mutually facing concave surfaces defining a trough having a plurality of pockets therein. In one preferred embodiment, the concave surface, or trough, of the first member overlaps at its axial edge an axial side of the second member to define a passageway.

CROSS REFERENCE TO A RELATED APPLICATION

This application is a continuation-in-part of my copending application Ser. No. 631,460, filed Apr. 17, 1967, now abandoned.

FIELD OF THE INVENTION

This invention relates to a fluid torque transfer device and, more particularly, relates to a construction within the fluid torque transfer device for minimizing cavitation in the flow of fluid therein while at the same time permitting a large quantity of fluid to flow therethrough to dissipate the heat generated by the operation thereof.

BACKGROUND OF THE INVENTION

For purposes of discussion, this invention will be illustrated in an environment with gas turbine engines. However, such discussion is not to be limiting for it is recognized that the device of this invenion is applicable in many other applications, such as vehicle retarders.

In the development of gas turbines for automotive use, a variety of problems have been encountered of which one of the most troublesome has been the association of the turbine with effective transmission means for providing suitable speed ratios between the turbine output and the drive wheels of the vehicle. While the so-called two shaft, or free turbine has more nearly approached the ideal torque curve for vehicular applications than the earlier known single shaft turbine, it is still desirable for the usual and, well understood reasons, to interpose a ratio-changing device between the turbine output and the drive wheels of the vehicle. Some efforts in this direction have taken the form of torque converters, which, however, are not particularly efficient when used with a single shaft turbine and are even less efficient when used with a free turbine. This efficiency can be appreciably improved if the turbine is used with a transmission utilizing positive gearing of the type having a countershaft (to distinguish from planetary systems) as the power transmitting agency. Such transmissions, however, have a neutral condition through which the transmission passes as it is shifted from one gear ratio to another gear ratio. This then introduces the problem of turbine run-away when the transmission is in neutral. This problem is serious enough in itself but it also complicates the synchronizing of the ratio gears during the shifting operation. Hence, it has in the past been thought that a transmission of the type utilizing positive gearing and a countershaft, to be effective with a gas turbine would either have to be capable of being shifted practically instantaneously or means would have to be provided by which the transmission would impose a constant load on the turbine even during its shifting procedure. The first of these possibilities is not feasible in a transmission of substantial weight, such as the transmission used in a highway bus or in a truck, due to the weight of the parts and the time consequently required to overcome the inertia in connection with a shifting operation. The second of these possibilities is a substantial improvement in at least some respects over torque converters since it does obtain the advantages of positive gear power transmissions but, as presently known, is subject to some of the same problems as planetary systems in that it requires a slip clutch and over-running mechanisms within the transmission, which mechanisms are subject to wear and therefore subject to the possibility of considerable maintenance.

One type of device for preventing turbine run-away is a fluid torque transfer device such as a fluid retarder connected to the output shaft of the free turbine and utilizing a liquid as the energy absorbing medium. However, since the turbine runs at extremely high speeds, namely approximately 30,000 r.p.m., the liquid passing through the device is subject to the possibility of violent cavitation which can result in serious structural damage to the device. Furthermore, the high speed operation of such a device will generate a considerable quantity of heat and precautionary measures must be taken to adequately cool the device to prevent damaging same due to overheating.

Accordingly, the objects of this invention include:

(1) To provide a fluid torque transfer device which eliminates cavitation of a damaging magnitude from the circulatory flow of the working fluid therein.

(2) To provide a fluid torque transfer device which permits a large quantity of fluid to flow therethrough to adequately cool the device to prevent a damaging thereof due to overheating.

(3) To provide a fluid torque transfer device, as aforesaid, wherein an axially facing side of the device has one member overlapped relative to the other so as to permit a large volume of working fluid to pass through the torque transfer device to permit a simultaneous cooling thereof.

(4) To provide a fluid torque transfer device, as aforesaid, which can by minor modifications use either a liquid or a gas as the working fluid.

(5) To provide a fluid torque transfer device, as aforesaid, which can use ambient air as the working fluid.

(6) To provide a fluid torque transfer device, as aforesaid, wherein the working fluid is caused to flow as smoothly as possible to improve the maximum energy absorbtion.

Other objects and purposes of this invention will become apparent to persons acquainted with torque transfer devices of this general type upon reading the following specification and inspecting the accompanying drawings, in which:

FIG. 1 is a schematical illustration of a fluid torque transfer device embodying the invention connected to the output shaft of a gas turbine engine;

FIG. 2 is a partial schematic of a fluid torque transfer device having a modified construction;

FIG. 3 is a perspective view of the component parts of the fluid torque transfer device embodying the invention;

FIG. 4 is a longitudinal sectional view through the fluid torque transfer device housing;

FIG. 5 is a sectional view taken along the line V—V of FIG. 4;

FIG. 6 is a sectional view taken along the line VI—VI of FIG. 5;

FIG. 7 is a fragmentary sectional view illustrating a modified form of the fluid torque transfer device.

Certain terminology will be used in the following decription for convenience only and are not to be limiting. The words "up," "down," "right" and "left" will designate directions in the drawings to which reference is made. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a fluid torque transfer device for transferring the torque from a cylindrical first member to an annular second member spaced radially outwardly from the first member to define a gap therebetween. The cylindrical first member has an outwardly facing trough around the periphery thereof, the surface of the trough having a smooth and curved transverse cross section throughout the entire cross-sectional extent for guiding the working fluid therein as smoothly as possible, the trough further having a plurality of blades circumferentially spaced therearound. The annular second member has an inwardly facing trough on the radially inner surface thereof located radially outwardly of, and at least partly facing the trough in the first member. The surface of the trough also has a smooth and curved transverse cross section throughout the entire cross-sectional extent for guiding the working fluid smoothly therein and same also has a plurality of blades circumferentially spaced therearound. A cylindrical sleeve is supported for axial movement into and out of the gap between the first and second members to control the amount of fluid circulating in the pockets to thereby control the amount of torque transferred between the first and second members. Further, in a preferred embodiment the trough of one of the first and second members adjacent an axial side thereof overlaps an axial side of the other member to define a passageway to permit a large quantity of fluid to flow through the device to provide an adequate cooling thereof during operation. By providing for the passage of large quantities of energy absorbing fluid, it becomes possible to use ambient air for this purpose. On the other hand, a liquid may be utilized but if this is done the speed at which the device operates must be limited sufficiently to avoid cavitation.

DETAILED DESCRIPTION

Referring first to FIG. 1, a fluid torque transfer device 10 is connected to the output of a free turbine-type gas turbine engine 11 of the type for use in land vehicles, such as trucks. The engine 11 includes a gas generator 12 which here comprises a compressor 13, combustion apparatus 14 and a compressor turbine 17. The combustion apparatus comprises a fuel pump (not shown) which delivers fuel to a line 18 and a plurality of nozzles, one of which appears at 19. The fuel control may be of any suitable type. The details thereof are immaterial to this invention.

The turbine 17 includes a rotor 22 which is connected by a shaft 23 to the rotor 24 of the compressor 13. The rotors 22 and 24 and the shaft 23 constitute the gas generator rotor 27. The motive fluid or driving gas discharged from the gas generator 12 flows through a power turbine 28 which drives a power output shaft 29. The power output shaft 29 is coupled through an appropriate coupling device 31 to the input shaft 32 of the torque transfer device 10.

A drive gear 21 (dotted lines in FIG. 1) is secured, in this embodiment, to the input shaft 32 of the torque transfer device 10. The drive gear 21 is shown in meshing engagement with a driven gear 26 (dotted lines in FIG. 1) which can be drivingly connected to the drive wheels of a vehicle (not shown) through a transmission (not shown). The gas exhausted from the power turbine is discharged through a duct 33.

The torque transfer device 10 comprises an inner cylindrical rotor member 36 secured to the input shaft 32. An annular outer member 37 is spaced radially outwardly of the inner rotor member 36 to define a gap 39 and is secured to an output member 38 which can be rotatably supported by means not shown or the output member 38 can be nonrotatably fixed to thereby nonrotatably fix the annular outer member 37 such as is illustrated in FIG. 4. In the latter embodiment, the fluid torque transfer device is a fluid retarder mechanism.

The inner rotor member 36 has a radially outwardly facing trough 41 around the periphery thereof. The surface 42 of the trough 41 has a smooth and curved transverse cross section throughout the entire cross-sectional extent for guiding the working fluid smoothly therein. This minimizes velocity losses which would otherwise occur in said fluid from sudden changes in direction of flow thereof and thereby maximizes energy transfer between the inner rotor member and the annnular outer member. The outer member 37 has a radially inwardly facing trough 43 on the radially inner surface thereof located radially outwardly of, and at least partly facing the trough 41 in the inner member 36. The surface 44 of the trough 43 has a smooth and curved transverse cross section throughout the entire cross-sectional extent for guiding the working fluid as smoothly as possible therein. In the particular embodiments illustrated in FIGS. 1 and 4, the curved surface 44 in the trough 43 has an end portion 45 which overlaps a corresponding end portion 46 of the curved surface 42 of the trough 41 an amount represented by $\Delta X$ in FIG. 1.

If desired, the input shaft 32 to the fluid torque transfer device 10 may be made hollow and have a piston 47 slideably disposed therein and urged toward a leftward position by a spring means 48. A source 49 of compressed air or hydraulic fluid is connected through a conduit 51 to the hollow interior of the shaft 32 on the left side of the piston 47 opposite the spring means 48. The source 49 is controlled by a control device 50. Thus, a controlled energization and de-energization of the source 49 will alternately cause a movement of the piston 47 within the hollow shaft 32.

A cylindrical sleeve 52 is connected to the piston 47 by a rod 53. The sleeve 52 has an outer diameter which is slightly less than the innermost diameter of the annular outer member 37 and an inner diameter which is slightly greater than the outer diameter of the inner rotor member 36. The sleeve is axially aligned with the gap 39 so that de-energization of the source 49 will permit the spring means 48 to draw the sleeve 52 into the gap 39 to prevent circulation of fluid between the annular members 36 and 37 and energization of the source 49 will act through the piston 47 and rod 53 to move the sleeve 52 out of the gap 39.

The means for introducing the working fluid into a working zone 54 defined by the surfaces 42 and 44 is not illustrated in the schematic representation of FIG. 1. This feature will be discussed in more detail hereinbelow with reference being had to FIGS. 4 and 5. However, the working fluid is permitted to escape through the passageway defined by the overlapped portion $\Delta X$. The amount of overlap $\Delta X$ is critical to the successful operation of the fluid torque transfer device 10. If too much overlap is provided, the working fluid will not be permitted to undergo a buildup in velocity so as to adequately transfer the torque from one member to the other. On the other hand, if the amount of overlap is too small, not enough of the working fluid will be permitted to pass through the device to permit it to operate satisfactorily and at the same time serve to cool the device while in operation. In this particular embodiment, having a diameter of 7½ inches and designed for operation with ambient air at 30,000 r.p.m., the amount of overlap $\Delta X$ is typically in the range of .125 inch to .250 inch.

FIG. 2 illustrates a modified construction of the inner rotor member 36A wherein the amount of the above-mentioned overlap is zero. In this particular embodiment, the axial end portion 46A of the inner rotor member 36A is radically aligned with the axial end portion 45A of the outer member 37A. Devices of this type will operate but they cannot be cooled as well as those devices which are constructed with an overlap. Thus, this embodiment is acceptable where the torque is applied only momentarily, as to prevent turbine run-away during the neutral part of a shift, but the overlap is preferable where the torque is applied over an extended period of time, as where the unit is being used as a vehicle retarder. The sleeve 52A is disposed so that it can slide wholly or partially into the gap 39A between the inner rotor member 36A and the outer member 37A to control the volume of circulating working fluid under conditions of smooth circulating flow. The fluid exiting from the working zone will discharge through the remaining portions of the gap 39A.

Referring now to the preferred embodiment of FIGS. 3–5, the trough 41 (FIGS. 3 and 5) in the inner rotor member 36 is provided with a plurality of bladed members 56 circumferentially spaced therearound to define a plurality of pockets 57 (FIG. 5). In this particular embodiment, the bladed members 56 are parallel to the axis of the rotor member 36 and are forwardly inclined with respect to the radius of the inner rotor member 36, that is, inclined toward the direction of rotation of the inner member illustrated by an arrow A in FIG. 5. The bladed members 56 may be integral with the trough 41 or may be separately fabricated and secured thereto by any convenient means such as by soldering, brazing or welding. The radially outer ends of the bladed members 56 are preferably flush with the radially outer diameter of the inner rotor member 36. In this particular embodiment, the blades 56 are inclined with respect to the radius at an angle of 45 degrees. It is recognized, however, that the blade members could be inclined within a range of at least between about 30 degrees and about 60 degrees and still produce a satisfactory operation.

The annular outer member 37 has a plurality of pairs of bladed members 61 and 62 alternatingly disposed circumferentially around the outer member 37 in the trough 43 and secured to the outer member in the same manner as set forth above with respect to the bladed members 56 to define pockets 58. The bladed members 61 are inclined with respect to the radius of the outer member at an angle equal to 45 degrees. However, it is recognized that here, too, the bladed members 61 and 62 can be disposed within the trough 43 at an angle at least within the range of about 30 degrees to about 60 degrees. The bladed members 62 are of a two-piece construction and consist of a flat blade element 63 and a blade element 64 secured at the edges thereof to the corresponding edges of the flat bladed element 63. The central portion of the flat blade element 64 is buckled away from the blade element 63 as at 66 to define a passageway 67 (FIGS. 5 and 6) therebetween. In this particular embodiment, the bladed members 62 are forwardly inclined with respect to the radius of the outer member 37 at an angle equal to the angle of inclination of the bladed members 61 which, in this particular embodiment, is at 45 degrees.

In this particular embodiment, the annular outer member 37 has a plurality of circumferentially spaced openings 69 therein which provide communication from the exterior portion of the annular outer member 37 to the passageway 67 between the blade elements 63 and 64.

Referring now to FIG. 4, the fluid torque transfer device 10 is installed within a housing 71. The housing 71 has a pin 72 therein which supports an inner bearing race member 73 which is fixed relative to the housing 71. A drive gear 74 is carried by rollers 75 on the inner bearing race member 73. Bearings 76 and 77 rotatably support a gear 78 which is in meshing engagement with the drive gear 74 and is driven thereby. An elongated extension 79 extends rightwardly of the gear member 78 and has the inner rotor member 36 secured to the right end thereof by splines 85. The gear member 78 has a hollow interior defined in part by a chamber 80. The piston 47 is slideably disposed axially within the chamber 80. A plug 82 having an orifice 83 therein is secured into the left end of the chamber 80. A shoulder 84 projects radially inwardly at the right end of the chamber 80 so that the plug 82 and the shoulder 84 define the axial limits of movement for the piston 47. The hollow interior of the gear 78 is further defined in part by a recess 86 which extends rightwardly of the shoulder 84 and terminates short of the right end of the extension 79. An opening 87 provides communication between the right end of the extension 79 and the right end of the recess 86. The rod 53 is connected to the piston 47 and extends through the recess 86 and opening 87 and is connected to a radial flange member 88 at the right end thereof which in turn is connected to the right edge of the cylindrical sleeve 52. The spring 48 is sleeveably mounted over the rod 53 within the recess 86 and, when in a tensioned condition, applies a leftward force on the piston 47.

The annular outer member 37 is secured in any convenient manner, such as by welding of its annular flange 70 to the housing 71. An outer surface 81 of the outer member 37 is spaced from the housing 71 to define a gap 89.

A cover 91 is secured to the housing 71 by any convenient means not shown. The cover 91 serves to enclose the right axial face of the housing 71.

The plug 82 sealingly engages an ene cap member 96 which is secured to the housing 71 by any convenient means (not shown) through a rotating seal 97 wherein a rotating seal component 99 is urged toward a fixed seal component 98 on the end cap 96 by a spring 100. An opening 101 is located in the end cap member 96 and communicates with the orifice 83 and the plug 82. The seal components 98 and 99 encircle the opening 101. The source 49 of compressed fluid is connected through the conduit 51 to the opening 101 and serves to supply pressurized fluid to the chamber 80 to cause a controlled movement of the piston 47 within the chamber 80 between the limits of the plug 82 and the shoulder 84.

The housing 71 includes a pair of chambers 102 and 103 which are connected, respectively, to a fluid inlet 104 and to a fluid inlet 104 and to a fluid outlet 106. The chamber 102 communicates with the openings 69 in the annular outer member 37 through the gap 89. The openings 69 communicate with the working zone 54 through the passageways 67 in the bladed members 62.

The cover 91 may be provided, if desired, with a plurality of openings 107 therein to connect the chamber inside the cover to the outlet 106 to permit the escape of working fluid gathered therein.

The overlapped ends 46 and 45 of the inner rotor member 36 and the annular outer member 37, respectively, are oriented in the same manner as is schematically illustrated in FIG. 1. However, it is to be recognized that the opposite axial ends of the curved surfaces 42 and 44 can be overlapped as at 108 and 109 in FIG. 7. The overlapped ends 108 and 109 are overlapped by an amount equal to ΔX which, in this particular embodiment, is identical to the overlap illustrated in FIGS. 1 and 4. The amount of overlap is to be sufficient to permit a large quantity of working fluid to pass through the fluid torque transfer device to permit a cooling of same but yet the amount of overlap is to be small enough to permit the fluid torque transfer device to operate satisfactorily by permitting a proper build up of velocity in the working fluid, as ambient air, to permit a proper transfer of torquet between the inner rotor member 36 and the annular outer member 37.

OPERATION

The operation of the device embodying the invention will be described in detail hereinbelow for a better understanding of the invention.

The schematic presentation of FIG. 1 illustrates the fluid torque transfer device 10 being driven by a turbine engine 11. It is recognized, however, that the fluid torque transfer device 10 can be driven by other devices such as a reciprocating engine or the drive wheels of a vehicle. In the particular embodiment of FIG. 4, it is assumed that the fluid torque transfer device 10 is driven by a device other than the turbine engine 11.

Referring to FIG. 4, and whatever the power source, the drive gear 74 will cause the gear 78 to rotate within the supporting bearings 76 and 77 and cause a simultaneous rotation of the inner rotor member 36. Since the annular outer member 37 is fixed to the housing 71, the fluid torque transfer device will function as a fluid retarder. However, it is to be recognized that the annular outer member 37 can be secured to an output shaft such as the output shaft 38 schematically illustrated in FIG. 1, in which case the fluid torque transfer device would function as a fluid coupling.

First of all, it will be assumed that the working fluid is air. Thus, it is possible for the inner rotor member 36 to be driven at a high speed, in the range of 20,000 to 40,000 r.p.m. without producing undesirable results. The air will be sucked into the chamber 102 through the opening 104, thence through the gap 89 and the openings 69, passageway 67 (FIG. 5) and into the central area of the working zone 54. The sucking action is created by a movement of the inner rotor member 36 which causes the working fluid to flow from the pockets 57 radially outwardly into the pockets 58 in the annular outer member 37. A continued rotation of the inner rotor member 36 will create a smooth circulatory movement of the working fluid within the working zone, the working fluid being guided over the smoothly contoured surfaces 42 and 44. Since the inner rotor member 36 rotates at a high velocity, the working fluid will circulate within the working zone 54 at a high circulatory velocity. The circulatory nature of the working fluid within the working zone will create a void or vacuum at the central region of the working zone 54 which will be filled by the air sucked into the working zone through the aforementioned chamber 102. As a result, no pumping mechanisms will be required in order to supply the working fluid to the working zone 54.

More specifically, when working fluid is introduced into the chamber 102, and the inner rotor member 36 is driven at a high velocity, the working fluid will be drawn into the working zone 54 and will first be smoothly caused to flow out of the pockets 57 in the inner rotor member 36 and into the pockets 58 of the annular outer member 37. The fluid moves around the smooth surfaces of the bottom of the pockets 58 and its direction of flow will be effectively changed from radially outwardly to radially inwardly. The fluid then flows smoothly into the pockets 57 of the inner rotor member 36. Since the blades of the annular outer member are inclined in the same direction as the blades on the inner rotor member 36, the fluid will receive an additional increment of velocity as it travels around the pockets of the inner member. This process repeats each time a given quantity of the fluid flows around the circle formed by the pockets until a very high velocity is reached. Such increase in fluid flow absorbs energy from the rotating member and tends to retard same.

The working fluid will continue to smoothly circulate within the working zone and then pass out through the passageway defined by the overlapped ends 45 and 46. The direction in which the fluid will circulate in the working zone 54 will be governed by the placement of the passageway between the overlapped ends. In the FIG. 4 embodiment, the fluid will circulate in the direction of the arrow B. In the FIG. 2 embodiment, the direction is not fixed and circulation may develop in either direction.

The exiting fluid, in the embodiment illustrated in FIG. 4, will be collected in the cover 91 and passed therefrom through the plurality of openings 107 into the chamber 103 and thence through the outlet 106. If a portion of the working fluid happens to exit from the working zone 54 at the left side of the inner rotor member 36, the working fluid will collect within a chamber 111 and flow therefrom through a passageway 112 into the chamber 103 and thence through the outlet 106.

Since the annular passageway between the ends 45 and 46 is defined by the overlap illustrated in FIGS. 1, 4 and 7, the working fluid will be permitted to smoothly exit from the working zone in a direction parallel to a tangent to the surface 44 at the end 46 and minimize turbulence in the working zone. Turbulence reduces the effectiveness of the device and should be minimized as much as practical. It has been found that the provision of the overlap will minimize the turbulence and hence minimize cavitation in the event a liquid, rather than air, is used as the working fluid.

When it is desired to terminate the torque transfer between the inner rotor member 36 and the annular outer member 37, the fluid pressure supplied to the chamber 80 can be terminated so that the spring means 48 will cause a movement of the piston 47 leftwardly to a position adjacent the plug 82. This movement will also cause the rod 53 to move leftwardly and carry therewith the radial flange 88 and the cylindrical sleeve 52. The left edge of the cylindrical sleeve 52 will now move into the gap 39 and when the piston 47 has completed its movement leftwardly to a position closely adjacent to or contacting the plug 82, the cylindrical sleeve 52 will have moved to completely block the flow of fluid between the inner rotor member 36 and the annular outer rotor member 37. As a result, no torque will be transferred between the two members.

The control device 50 for controlling the source 49 may be any convenient mechanism that may be positioned within the cab of a vehicle so that the operator of the vehicle can activate the source 49 to control the degree of torque transfer between the inner rotor member 36 and the annular outer member 37. Thus, if the operator of a vehicle such as a truck, is guiding the truck down a steep incline, the fluid torque transfer device 10, which in the FIG. 4 embodiment is a retarder mechanism, will be activated to control the velocity of the vehicle down the incline. Furthermore, the control mechanism 50 may be of the automatic type for use in the FIG. 1 embodiment of automatically controlling the amount of retardation applied to the output shaft of a turbine engine 11 to prevent turbine run-away when the load on the output shaft 29 has been removed therefrom.

Although the retarding device illustrated in FIG. 4 is either completely on or completely off, it is recognized that for a device utilizing air as the torque absorbing medium, the sleeve 52 can be properly controlled so that it will be capable of assuming positions intermediate the "on-off" positions. Such mechanism may be of any conventional type and has, therefore, not been illustrated. With air, there is no concern about cavitation and the retarding device can be driven at very high speeds.

While the foregoing discussion has assumed that air is the working fluid, it is recognized that liquids may be used as the working fluid as long as the operational speed of the device is held low enough to avoid cavitation problems. While cavitation can be controlled by the type of liquid used, there must be provided a smoothly contoured surface over which the liquid will flow so as to prevent an unnecessary disturbance in the flow. The overlap of the ends 45 and 46 permits a smooth exit of the working fluid from the working zone 54 as explained above with respect to air and thereby minimizes the cavitation in the device.

Furthermore, the liquid will flow substantially nonturbulently in a smoothly circulating manner within the working zone 54. Thus, as in the case with air, a maximum energy transfer will occur for optimum operation.

With liquid as the working fluid, it is usually preferable to limit the control sleeve to either its on or its off position. Thus, the "on-off" control illustrated in FIG. 4 will work satisfactorily to render the device operative and inoperative.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fluid torque transfer device, comprising:
a cylindrical first member having an outwardly facing trough around the periphery thereof, the surface of said trough having a smooth and curved transverse cross section throughout the entire cross-sectional extent for guiding said fluid smoothly therein, said trough having a plurality of blades circumferentially spaced therearound to define a plurality of first pockets, said blades being forwardly inclined with respect to the radius of said cylindrical first member;
an annular second member spaced radially outwardly of said first member to define a gap therebetween, said second member having an inwardly facing trough on the radial inner surface thereof located radially outwardly of, and at least partly facing said trough in said first member, the surface of said trough on said second member having a smooth and curved transverse cross section throughout the entire cross-sectional extent for guiding said fluid smoothly therein, said trough in said second member having a plurality of blades circumferentially spaced therearound to define a plurality of second pockets, said last-mentioned blades being forwardly inclined with respect to the radius of said second member whereby said fluid is circulated smoothly and at a high velocity within said first and second pockets when at least one of said members is rotated in a forward direction;
a cylindrical sleeve supported for axial movement into and out of said gap to control the amount of fluid circulating in said pockets to thereby control the amount of torque transferred between said first and second members.

2. The fluid torque transfer device defined in claim 1, wherein said first member is supported for rotational movement; and
wherein said second member is nonrotatably fixed.

3. The fluid torque transfer device defined in claim 1, wherein said first and second members are supported for relative rotational movement.

4. The fluid torque transfer device defined in claim 1, wherein said trough in said first member and said trough in said second member have semicircular transverse sections.

5. The fluid torque transfer device defined in claim 1, wherein the angle of said forward inclination of said blades on said first member and said second member are at 45 degrees with respect to the radii of said members.

6. The fluid torque transfer device defined in claim 1, wherein the angles of said forward inclination of said blades on said first member and said second member are within the range of about 30 degrees and about 60 degrees with respect to the radii of said members.

7. A fluid torque transfer device, comprising:
a cylindrical first member having an outwardly facing trough around the periphery thereof, the trough having a plurality of blades circumferentially spaced thereon to define a plurality of first pockets;
an annular second member spaced radially outwardly of the first member to define a gap therebetween, the second member having an inwardly facing trough on the radial inner surface thereof located radially outwardly of, and at least partly facing the trough in the first member, the trough in the second member having a plurality of blades circumferentially spaced therearound to define a plurality of second pockets, the pockets of one of the first and second members overlapping the pockets of the other adjacent an axial side thereof to define an annular passageway permitting the fluid to escape from the troughs.

8. The fluid torque transfer device defined in claim 7, wherein the annular second member is spaced radially outwardly of the first member to define a gap therebetween; and
including a cylindrical sleeve for axial movement into and out of the gap to control the amount of fluid circulating in the pockets to thereby control the amount of torque transferred between the first member and the second member.

9. The fluid torque transfer device defined in claim 8, wherein the trough on the first member has a smooth and curved transverse cross section throughout the entire cross-section extent for guiding the fluid smoothly therein; and
wherein the trough on the second member has a smooth and curved transverse cross section throughout the entire cross-sectional extent for guiding the fluid smoothly therein, the surface of the trough on the annular second member adjacent one side thereof being spaced axially from the corresponding side of the surface of the trough in the cylindrical first member to provide said overlapping and for minimizing turbulence in the fluid as the fluid exits from the troughs.

References Cited
UNITED STATES PATENTS

| | | | |
|---|---|---|---|
| 2,280,042 | 4/1942 | Duffield | 60—54 |
| 2,586,136 | 2/1952 | Wyndham | 60—54 |
| 2,672,953 | 3/1954 | Cline. | |
| 2,737,276 | 3/1956 | Wyndham. | |
| 2,807,217 | 9/1957 | Krzyszczuk | 60—54 XR |
| 2,987,887 | 6/1961 | Fowler | 60—54 |

EDGAR W. GEOGHEGAN, Primary Examiner

U.S. Cl. X.R.

60—19; 103—115; 188—90